United States Patent [19]

Silver

[11] Patent Number: 4,556,299
[45] Date of Patent: Dec. 3, 1985

[54] LIGHT POWERED ROTATING DETECTION MIRROR

[75] Inventor: Frederick Silver, Miami, Fla.

[73] Assignee: Fred Silver & Company, Inc., Newark, N.J.

[21] Appl. No.: 588,492

[22] Filed: Mar. 12, 1984

[51] Int. Cl.$^4$ .......................... G02B 5/10; G02B 7/18
[52] U.S. Cl. .................................. 350/603; 350/637; 362/253
[58] Field of Search ...................... 350/603, 637, 632; 362/253; 136/291

[56] References Cited

U.S. PATENT DOCUMENTS

| | | | |
|---|---|---|---|
| 3,900,243 | 8/1975 | Johnsson | 350/637 |
| 3,917,386 | 11/1975 | Swales | 350/637 |
| 4,374,406 | 2/1983 | Hepp | 40/473 |
| 4,379,324 | 4/1983 | Thompson | 40/473 |

Primary Examiner—Jon W. Henry
Attorney, Agent, or Firm—Daniel H. Bobis

[57] ABSTRACT

A light powered rotating detection mirror includes a detection mirror formed of two back-to-back convex mirrors; a motor having a rotatable shaft from which the detection mirror is supported by a first interconnecting chain; a housing and a second interconnecting chain for supporting the motor from a ceiling; a sleeve positioned in surrounding relation to a fluorescent bulb; a solar cell positioned between the sleeve and the fluorescent bulb for converting light energy to electrical energy; and electrical wires connecting the solar cell to the motor for actuating the motor to rotate the detection mirror.

6 Claims, 4 Drawing Figures

LIGHT POWERED ROTATING DETECTION MIRROR

BACKGROUND OF THE INVENTION

This invention relates generally to detection mirrors and, more particularly, is directed to a rotating detection mirror.

Convex-shaped detection mirrors have commonly been used in stores, banks and the like for enabling the employees in such businesses to view the entire premises open to the public. Such detection mirrors have particular utility for detecting the occurrence of an illegal activity, such as theft. Such detecting mirrors have conventionally been fixedly mounted at various locations in the premises at approximate ceiling height.

In order to extend the viewing range of such detection mirrors, a detection mirror presently sold in Japan provides a hanging eye by which the detection mirror can be hung from the ceiling, and a battery operated motor secured to the non-mirrored side of the detection mirror for causing the mirror to swivel or rotate so as to expand the viewing range of the mirror. With such arrangement, however, the batteries used to power the motor continually wear out and have to be replaced. Since the detection mirror is hung at approximate ceiling height, replacement of the batteries is troublesome and time consuming.

Further, only one side of the detection mirror has a convex mirror while, to the contrary, back-to-back convex mirrors could not be used in view of the batteries and motor being secured to the detection mirror as described above.

It is also known to provide a light powered rotating display sign in which solar cells are mounted within a sleeve which is wrapped about a fluorescent tube. The solar cells convert the light energy from the fluorescent light to electrical energy which is supplied to wires connected thereto to a motor which hangs from the sleeve. A sign or other display device is, in turn, supported from the motor by means of a slip swivel connector or other connecting means, whereby energization of the motor from the solar cells causes the sign to rotate. Such a device is shown in U.S. Pat. No. 4,379,324 and is commonly sold by Hankscraft Motors, a Division of Gerber Products Company, located in Reedsburg, Wis. Such rotating motors, are merely designed to rotate a sign or display and there is no disclosure for using the light powered motor thereof to rotate a two-sided detection mirror. Also see U.S. Pat. No. 4,227,327 to Thompson.

With respect to battery operated rotating displays, see U.S. Pat. No. 4,005,843 to Wengel and U.S. Pat. No. 3,964,189 to Belokin, Jr.

OBJECTS AND SUMMARY OF THE INVENTION

Accordingly, it is an object of this invention to provide a rotating detection mirror that is light powered.

It is another object of this invention to provide a light powered rotating detection mirror which includes back-to-back convex mirror halves.

It is still another object of this invention to provide a light powered rotating detection mirror that is easy to use and install and is relatively inexpnesive.

In accordance with an aspect of this invention, a light powered rotating detection mirror includes a detection mirror; support means for supporting the detection mirror above a surface; motor means for rotating the detection mirror; and power means for supplying power to the motor means in response to a light source so as to control the motor means to rotate the detection mirror.

The above, and other, objects, features and advantages of the present invention will become readily apparent from the detailed description thereof which is to be read in connection with the accompanying drawings.

DETAILED DESCRIPTION OF A PREFERRED EMBODIMENT

Figures 1, 2, 3, 4:
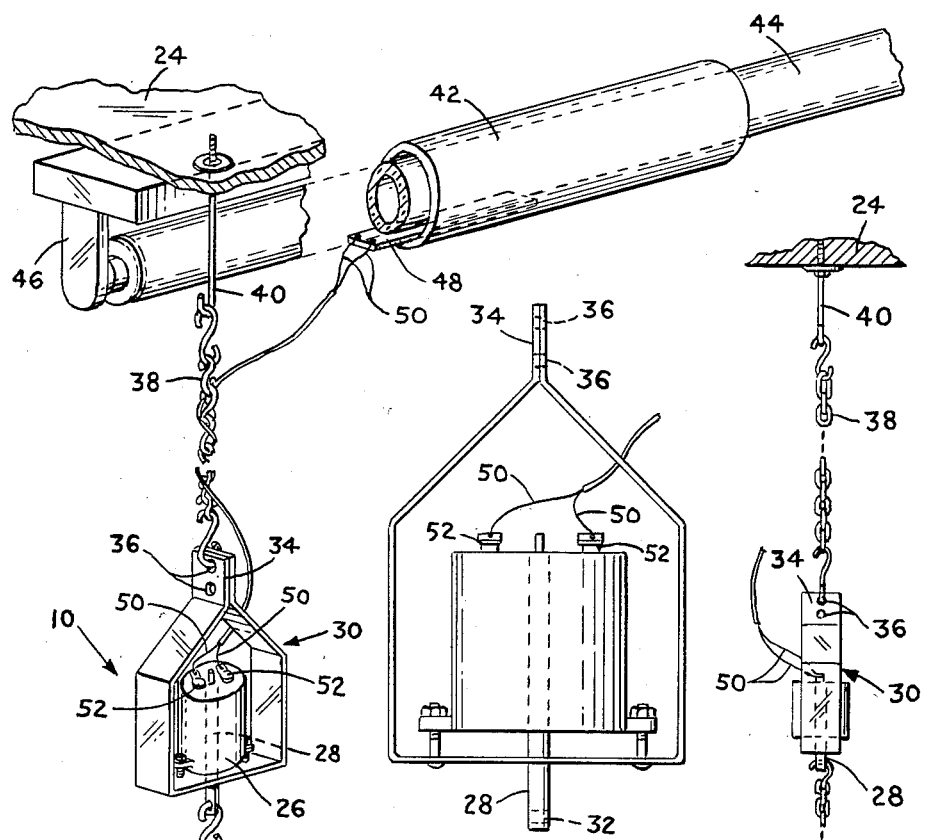
FIG. 1 is a perspective view of a light powered rotating detection mirror according to the present invention.
FIG. 2 is a partially broken away, side plan view of the light powered rotating detection mirror of FIG. 1.
FIG. 3 is a front plan view of the motor assembly of the light powered rotating detection mirror of FIG. 1.
FIG. 4 is a side plan view, partially in phantom of the motor assembly of the light powered rotating detection mirror of FIG. 1.

Referring to the drawings in detail, and initially to FIG. 1 thereof, a light powered rotating detection mirror 10 according to the present invention includes a detection mirror 2 formed of two back-to-back convex mirrors 14 and 16 which are assembled together by a circumferential guide 18 which surrounds and joins the edges of the respective mirrors 14 and 16.

Each of mirrors 14 and 16 is provided with an aperture 20 through which a chain 22 or the like can be provided for hanging detection mirror 12 from a ceiling 24.

As shown in FIGS. 2 and 3, a motor 26 having a rotating drive shaft 28 is mounted within a five-sided housing 30. The free end of shaft 28 has an aperture 32 through which the opposite end of chain 22 extends, whereby detection mirror 12 is supported from motor 26 in a hanging arrangement.

Housing 30 is provided with an extension 34 at its upper end, with one end of a second chain 38 and the like support extending through aperture 36. The opposite end of the second chain 38 is supported by the free end of a hooked support member 40, the opposite end of which is secured to ceiling 24 by any suitable means, such as a threaded arrangement.

In this manner, hook 40 supports housing 30 and motor 26 by means of the interconnecting second chain 38. Motor 26, in turn, supports detection mirror 12 through the first interconnecting chain 22.

A sleeve 42 slides on and surrounds a fluorescent bulb 44 mounted in a conventional manner within a fluorescent socket arrangement 46 which, in turn, is connected to and supported separately by ceiling 24. At least one solar power cell 48 is provided between sleeve 42 and flourescent bulb 44, for example, as shown in U.S. Pat. No. 4,379,324 and electrical leads 50 electrically connect power cell 48 to corresponding terminals 52 on motor 26 for supplying electrical power thereto.

In accordance with the present invention, the solar power cells 48 convert light energy from fluorescent bulb 44 to electrical energy which is supplied to motor 26. Rotatable drive shaft 28 of motor 26 is thereby caused to rotate which, in turn, rotates detection mirror 12 through interconnecting chain 22. Since detection mirror 12 is two-sided, the viewing range is greatly increased over conventional detection mirrors. With the present invention, instead of mounting the detection mirror in a corner, as is conventional, the light powered rotating detection mirror 10 according to the present invention can be mounted in the center of a store, bank or the like so as to increase the viewing range, while consequently reducing the number of detection mirrors that are needed.

Having described a specific preferred embodiment of the present invention with reference to the accompanying drawings, it is to be understood that the present invention is not limited to that precise embodiment, and that various changes and modifications may be effected therein by one of ordinary skill in the art without departing from the spirit or scope of the present invention as defined by the appended claims.

What is claimed is:

1. A light energy powered rotating detection mirror comprising:
   a. a detection mirror including two back-to-back convex mirrors;
   b. support means for supporting said detecting mirror above a surface;
   c. motor means for rotating said detection mirror; and
   d. power means responsive to a source of light energy for supplying power to said motor means so as to operate said motor and cause said detection mirror to rotate whenever light energy is supplied to the power means.

2. A light powered rotating detection mirror according to claim 1; in which said two back-to-back convex mirrors have edges; and said detection mirror further includes a circumferential guide which joins said respective edges of said back-to-back convex mirrors.

3. A light powered rotating detection mirror according to claim 2; wherein said power means includes solar cell means associated with said light source for converting light energy to electrical energy and electrical connection means for supplying said electrical energy from said solar cell means to said motor means so as to control said motor means to rotate said detection mirror.

4. A light powered rotating detection mirror according to claim 3; wherein said light source is a fluorescent bulb; and further including sleeve means mounted on said fluorescent bulb in surrounding relation thereto, and said solar cell means being positioned between said fluorescent bulb and said sleeve means.

5. A light energy powered rotating detection mirror comprising:
   a. a detection mirror;
   b. support means for supporting said detection mirror above a surface;
   c. motor means for rotating said detection mirror, said motor means including, a rotatable drive shaft to which said detection mirror is connected;
   d. motor mounting means for mounting said motor means to a ceiling in a hanging relation;
   e. first chain means for supporting said motor mounting means in a hanging relation from said ceiling;
   f. said support means including second chain means for supporting said detection mirror from said rotating drive shaft of said motor means; and
   g. power means responsive to a source of light energy for supplying power to said motor means so as to rotate the drive shaft in said motor and to cause said detection mirror to rotate whenever light energy is supplied to the power means.

6. A light energy powered rotating detection mirror comprising:
   a. a detection mirror;
   b. support means for supporting said detection mirror in an operating position;
   c. motor means connected to the support means and to the detection mirror in assembled position and including, a rotatable drive means, and said detection mirror connected to the rotatable drive means for operative rotation therewith, and
   d. power means responsive to a source of light energy for supplying power for rotating the drive means on said motor means whereby said detection mirror will rotate whenever light energy is supplied to the power means.

* * * * *